United States Patent
Jarboe

(10) Patent No.: US 10,054,495 B2
(45) Date of Patent: Aug. 21, 2018

(54) INFRARED CONTRASTING COLOR TEMPERATURE MEASUREMENT SYSTEM

(71) Applicant: Exergen Corporation, Watertown, MA (US)

(72) Inventor: Jason N. Jarboe, Somerville, MA (US)

(73) Assignee: Exergen Corporation, Watertown, MA (US)

( * ) Notice: Subject to any disclaimer, the term of this patent is extended or adjusted under 35 U.S.C. 154(b) by 638 days.

(21) Appl. No.: 14/190,739

(22) Filed: Feb. 26, 2014

(65) Prior Publication Data

US 2015/0010038 A1 Jan. 8, 2015

Related U.S. Application Data

(60) Provisional application No. 61/842,169, filed on Jul. 2, 2013.

(51) Int. Cl.
*G01J 5/00* (2006.01)
*G01J 5/06* (2006.01)
*G01K 7/00* (2006.01)

(52) U.S. Cl.
CPC ............ *G01K 7/003* (2013.01); *G01J 5/0003* (2013.01); *G01J 5/061* (2013.01); *G01J 2005/0051* (2013.01); *G01J 2005/0074* (2013.01)

(58) Field of Classification Search
CPC .... G01J 5/00; G01J 5/0003; G01J 5/06; G01J 5/0022

(Continued)

(56) References Cited

U.S. PATENT DOCUMENTS 2,424,976 A 8/1947 Golay et al.
3,378,685 A * 4/1968 Green .................. G01N 25/72
250/341.6

(Continued)

FOREIGN PATENT DOCUMENTS

CZ 201200175 A3 * 9/2013
DE 004109399 A1 * 4/1990

(Continued)

OTHER PUBLICATIONS

PCT/US2014/045073 Notification Concerning Transmittal of International Preliminary Report on Patentability dated Jan. 14, 2016 entitled "Infrared Contrasting Color Temperature Measurement System."

(Continued)

*Primary Examiner* — Gail Kaplan Verbitsky
(74) *Attorney, Agent, or Firm* — Hamilton, Brook, Smith & Reynolds, P.C.

(57) ABSTRACT

Devices and corresponding methods can be provided to measure temperature and/or emissivity of a target. Emissivity of the target need not be known or assumed, and any temperature difference between a sensor and the target need not be zeroed or minimized. No particular bandpass filter is required. Devices can include one or two sensors viewing the same target as the target views different respective viewed temperatures. The respective viewed temperatures can be sensor temperatures, and a single sensor can be set to each of the respective viewed temperatures at different times. An analyzer can determine the temperature and/or emissivity of the target based on the respective viewed temperatures and on plural net heat fluxes detected by the sensors and corresponding to the respective viewed temperatures.

17 Claims, 5 Drawing Sheets

(58) Field of Classification Search
USPC .. 374/29, 30, 137, 120, 121, 1, 2, 208, 128; 702/135, 99
See application file for complete search history.

(56) References Cited

U.S. PATENT DOCUMENTS

| | | | |
|---|---|---|---|
| 3,525,260 A | 8/1970 | Kung | |
| 3,581,090 A * | 5/1971 | Brown | G01S 5/166 250/363.01 |
| 3,720,103 A * | 3/1973 | Adams | G01K 17/00 374/29 |
| 3,916,194 A * | 10/1975 | Novak | G07D 7/12 250/338.1 |
| 4,213,394 A * | 7/1980 | Brenner | F42C 13/023 102/213 |
| 4,555,764 A * | 11/1985 | Kuehn | F24J 2/0007 126/585 |
| 4,602,642 A | 7/1986 | O'Hara et al. | |
| 4,636,091 A | 1/1987 | Pompei et al. | |
| 4,687,344 A * | 8/1987 | Lillquist | G01J 5/08 250/332 |
| 4,854,730 A * | 8/1989 | Fraden | G01J 5/04 374/164 |
| 4,900,162 A | 2/1990 | Beckman et al. | |
| 5,021,663 A * | 6/1991 | Hornbeck | G01J 5/02 250/338.1 |
| 5,054,936 A * | 10/1991 | Fraden | G01J 5/16 257/E27.122 |
| 5,099,120 A * | 3/1992 | Turnbull | H01L 37/02 250/332 |
| 5,127,742 A * | 7/1992 | Fraden | G01J 5/524 374/126 |
| 5,319,202 A | 6/1994 | Pompei | |
| 5,377,126 A * | 12/1994 | Flik | G01J 5/0003 374/120 |
| 5,626,147 A * | 5/1997 | Lackey | G01J 5/04 374/E13.003 |
| 5,645,349 A * | 7/1997 | Fraden | G01J 5/20 374/120 |
| 5,894,126 A | 4/1999 | Pompei et al. | |
| 5,967,992 A * | 10/1999 | Canfield | G01K 7/42 374/E7.042 |
| 6,015,234 A * | 1/2000 | Gourrier | G01J 5/24 374/164 |
| 6,491,425 B1 * | 12/2002 | Hammiche | B82Y 35/00 374/10 |
| 6,630,991 B2 * | 10/2003 | Kitamura | H01L 21/67248 219/494 |
| 6,641,301 B2 | 11/2003 | Pompei | |
| 7,064,328 B2 * | 6/2006 | Bluzer | G01J 5/20 250/332 |
| 7,276,695 B2 * | 10/2007 | Oda | G01J 5/061 250/330 |
| 7,318,671 B1 * | 1/2008 | Moghaddam | G01N 25/18 374/30 |
| 7,553,070 B2 * | 6/2009 | Kollgaard | G01N 25/72 250/341.1 |
| 8,192,074 B2 * | 6/2012 | Liess | G01J 5/16 250/338.1 |
| 2002/0068371 A1 * | 6/2002 | Yun | G01K 7/42 438/14 |
| 2003/0230562 A1 * | 12/2003 | Yoshimura | G01J 5/0003 219/405 |
| 2004/0136434 A1 * | 7/2004 | Langley | G01K 17/20 374/29 |
| 2005/0134827 A1 * | 6/2005 | Box | G03F 7/707 355/72 |
| 2006/0239332 A1 * | 10/2006 | Harr | G01J 5/02 374/208 |
| 2007/0282218 A1 * | 12/2007 | Yarden | G01K 1/165 600/549 |
| 2008/0107147 A1 * | 5/2008 | Kollgaard | G01N 25/72 374/5 |
| 2008/0230698 A1 * | 9/2008 | Simelgor | G01J 5/02 250/338.1 |
| 2008/0262782 A1 * | 10/2008 | Pompei | A61B 5/0008 702/131 |
| 2009/0219969 A1 * | 9/2009 | Yamamoto | G01K 5/486 374/29 |
| 2011/0228811 A1 * | 9/2011 | Fraden | G01J 5/061 374/130 |
| 2011/0317737 A1 * | 12/2011 | Klewer | G01K 1/16 374/29 |
| 2013/0161526 A1 * | 6/2013 | Tajima | A61B 6/5258 250/394 |
| 2013/0181134 A1 * | 7/2013 | Forster | F01N 3/0222 250/341.6 |
| 2015/0017592 A1 * | 1/2015 | Jarboe | G01J 5/06 432/8 |
| 2015/0051500 A1 * | 2/2015 | Elliott | A61B 5/6898 600/480 |

FOREIGN PATENT DOCUMENTS

| | | | |
|---|---|---|---|
| EP | 097473 A1 * | 6/1983 | |
| EP | 0 623 811 A1 | 11/1994 | |
| EP | 0 623 811 B1 | 1/1998 | |
| EP | 2 187 189 A1 | 5/2010 | |
| JP | 202003106902 A * | 9/2003 | |
| JP | 02007115751 A * | 5/2007 | |
| JP | 02008014590 A * | 1/2008 | |
| JP | 02010260093 A * | 11/2010 | |
| RU | 2054168 C1 * | 10/1991 | |
| SU | 1781563 A1 * | 12/1988 | |
| WO | WO 2015/002964 A1 | 1/2015 | |

OTHER PUBLICATIONS

Chen, L., et al., "Design Principle for Simultaneous Emissivity and Temperature Measurements," *Optical Engineering*, 29(12): 1445-1448 (1990).

Dolezal, I. and Hes, L., "Emissivity Independent Low-Temperature Pyrometry," *Proc. SPIE*, 6939: 1-11 (2008).

Exergen Corporation SmartIRt/c http://www.exergen.com/industrial/smartirtc/index.html.

Exergen Corporation SmartIRt/c Infrared Temperature Sensor.

Nordine, P.C., "The Accuracy of Multicolor Optical Pyrometry," *High Temperature Science*, 21(2): 97-109 (1986).

PCT/US2014/045073 Notification of Transmittal of the International Search Report and the Written Opinion of the International Searching Authority, or the Declaration dated Sep. 19, 2014.

Woskov, P.P. and Sundaram, S.K., "Thermal Return Reflection Method for Resolving Emissivity and Temperature in Radiometric Measurements," *J. App. Phys.*, 92(10): 6302-6310 (2002).

* cited by examiner $Q_{Anet} = Q_{A\,target} - Q_{A\,sensor}$ $Q_{Bnet} = Q_{B\,target} - Q_{B\,sensor}$

INFRARED CONTRASTING COLOR TEMPERATURE MEASUREMENT SYSTEM

RELATED APPLICATION

This claims the benefit of U.S. Provisional Application No. 61/842,169, filed on Jul. 2, 2013. The entire teachings of the above application are incorporated herein by reference.

BACKGROUND

Non-contact temperature measurement is required for many objects. Conventional infrared radiation sensors determine temperature of a viewed target based on measured heat flux from the target, an emissivity of the target, and the temperature of the sensor. If the target surface has a known emissivity, then the temperature of the target can be accurately measured based on the known emissivity and the output of the radiation sensor. Emissivity can vary from material to material and from surface to surface. Where emissivity of a target is unknown, emissivity can sometimes be assumed, and some techniques exist for decreasing measurement uncertainties due to emissivity assumptions.

SUMMARY

A drawback of conventional temperature measurements involving one sensor temperature is that they often cannot be used to accurately measure target temperature when the emissivity of the target is unknown. Thus, if the emissivity of the target is unknown or changes over time with, for example, a manufacturing process, then a one-temperature sensor measurement may not be sufficient. Furthermore, techniques involving assumed emissivities have drawbacks including increased measurement uncertainty and system cost. Furthermore, although non-contact temperature measurements can be made for targets of unknown emissivity by minimizing or zeroing a temperature difference between the target surface and the sensor, such zeroing of the temperature difference may not always be desirable or possible.

According to the present disclosure, devices and methods are provided for non-contact measurement of targets with sensors, even where emissivity of the target surface is unknown or changes. Furthermore, it is not necessary to assume emissivity or zero any temperature difference between the target and the sensor. Moreover, devices according to the present disclosure can continue to measure temperature even where an emissivity changes, for example, during a manufacturing process.

Devices and methods according to the present disclosure can utilize two sensors held at different temperatures and viewing the same target surface to obtain accurate temperatures and or emissivities based on net heat fluxes measured by the two different sensors held at different temperatures. An alternative method and device according to embodiments of the invention includes using a single sensor to obtain two different heat fluxes corresponding to two different respective temperatures at which the sensor is held at different times. One advantage of these devices and methods is a relative insensitivity to contamination of sensors or sensor windows. In particular, two-sensor devices tend to be insensitive to contamination that is equally distributed on the two sensors. Moreover, one-sensor device can be insensitive to contamination without regard to the degree of contamination of another sensor.

Devices and methods according to the present disclosure can even be used where targets reflect, toward the sensor, radiation from a sensor background surface or sensor housing in addition to radiation from the sensor itself.

A method of determining temperature and corresponding device can include detecting plural net heat fluxes with one or more radiation sensors viewing a target as the target views different respective viewed temperatures. The method can also include determining, independent of an emissivity of the target, a temperature of the target based on the plural net heat fluxes and on the respective viewed temperatures.

The method can include changing a temperature of one of the radiation sensors to achieve the respective viewed temperatures, which can be sensor temperatures. Further, where the temperature of the one radiation sensor is changed, the temperature can be oscillated. The radiation sensors can be thermopile or bolometer sensors, for example.

Determining the target temperature can be performed by an analyzer and can be based further on a transmission factor of a window or filter between the radiation sensor and the target. Determining the target temperature can also be based further on plural sensor-emitted heat fluxes corresponding, respectively, to the respective viewed temperatures. At least one of the net heat fluxes can include heat flux emitted from both a radiation sensor and from an opaque sensor background surface temperature controlled to match a temperature of the radiation sensor. The temperature control can be performed, for example, by a thermal controller.

A method of determining emissivity, and a corresponding device, can include detecting plural net heat fluxes with one or more radiation sensors viewing a target as the target views different respective viewed temperatures. The method can also include determining an emissivity of the target based on the plural net heat fluxes and on the respective viewed temperatures with, for example, an analyzer. Detecting the plural net heat fluxes can be accomplished by using one radiation sensor, and the temperature of the one radiation sensor can be changed to achieve the respective viewed temperatures. Furthermore, the temperature of the one radiation sensor can be oscillated.

The plural net heat fluxes can be detected with respective ones of the radiation sensors. The method can also include calculating a temperature of the target based on the determined emissivity. Determining the emissivity can be performed by an analyzer and can be based further on a transmission factor of a window between the radiation sensor and the target. Determining the emissivity can be based further on plural sensor-emitted heat fluxes corresponding, respectively, to the respective viewed temperatures. The respective viewed temperatures can be sensor temperatures. At least one of the net heat fluxes can include heat flux emitted from both a radiation sensor and from an opaque sensor background surface temperature controlled to match a temperature of the radiation sensor. The one or more radiation sensors can be thermopile or bolometer sensors, for example.

A method of determining temperature can include detecting plural net heat fluxes with a radiation sensor viewing a target as the target views different respective viewed temperatures. The method can also include determining a temperature of the target, independent of an emissivity of the target, based on the plural net heat fluxes and the respective viewed temperatures.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1A:
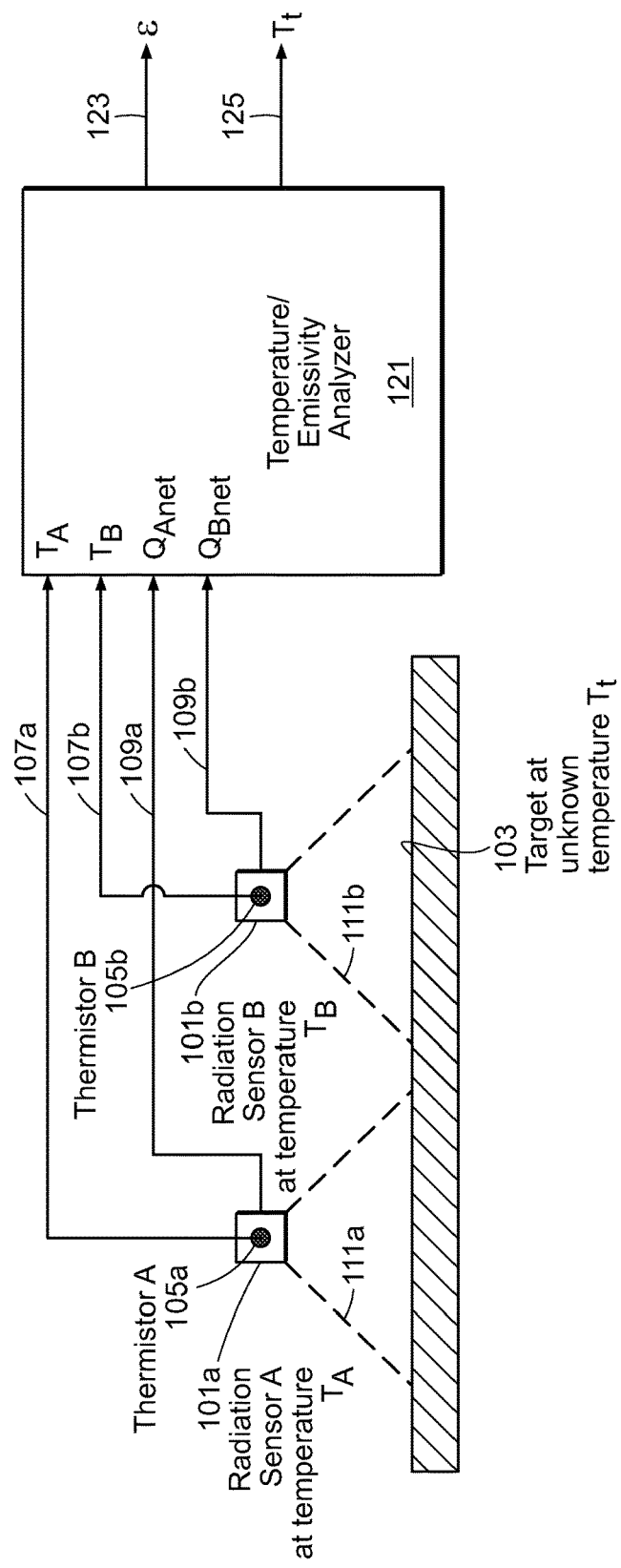
FIG. 1A is an illustration of two-radiation-sensor device for determining temperature and/or emissivity of a target.

One drawback of conventional one-temperature sensor measurements is that their accuracy is limited to the extent that the target emissivity remains uncertain. Further, target emissivity can change over time with, for example, a manufacturing process, and a one-temperature sensor measurement may not be sufficient, even if an initial assumed emissivity is close to the actual value for the target surface.

Furthermore, although emissivity values can be assumed under certain conditions, techniques involving emissivity assumptions remain sensitive to incorrect values of emissivity and have additional drawbacks. For example, a bandpass filter can be used to block longer-wavelength radiation from entering a radiation sensor, making temperature measurements less sensitive to error due to unknown emissivity. However, any improvements offered by this technique are modest, uncertainty can increase due to a lower measurable signal, and a filter specific to the expected target temperature range may be required.

Another technique involves using a narrow bandpass filter to limit radiation incident on a radiation sensor and assuming emissivity is about 1 within the narrow filter bandpass range. The narrow bandpass filter technique is inadequate because radiation sensor signals are small, which sometimes requires that the device be fitted with higher-quality optics and electronics to perform acceptably. This technique can also fail where target emissions are not unusually strong within some bandpass filter range. Furthermore, implementations of this technique are surface-specific and cannot be expected to work satisfactorily for an arbitrary surface.

According to methods described in U.S. Provisional Patent Applications 61/842,204 (filed Jul. 2, 2013) and 61/871,283 (filed Aug. 28, 2013), non-contact temperature measurements can be made for targets of unknown emissivity by minimizing or zeroing a temperature difference between the target surface and the sensor. However, such zeroing of the temperature difference may not be desirable or possible for every application.

According to the present disclosure, devices and methods are provided for non-contact temperature measurement of targets with sensors, even where emissivity of the target surface is unknown or changes. Emissivity need not be assumed, since it can be measured along with temperature. Particular bandpass filters are not required, and radiation sensor signals are adequate such that unusually expensive optical and electrical components are not required. Furthermore, it is not necessary to zero any temperature difference between the target and the sensor.

Devices and methods according to the present disclosure can utilize two sensors held at different respective viewed temperatures and viewing the same target surface to obtain accurate temperatures and or emissivities based on net heat fluxes measured by the two different sensors held at different respective viewed temperatures.

An alternative method and device according to embodiments of the invention includes using a single sensor to obtain two different heat fluxes corresponding to two different respective temperatures at which the sensor is held at different times.

An additional advantage of these devices and methods is a relative insensitivity to contamination of sensors or sensor windows. In particular, two-sensor devices tend to be insensitive to contamination that is equally distributed on the two sensors. Moreover, one-sensor devices can be insensitive to contamination without regard to the degree of contamination of another sensor, and they can also be simpler and less expensive than devices having two or more sensors.

Devices and methods according to the present disclosure can even be used where targets reflect, toward the sensor, radiation from a sensor background surface or sensor housing in addition to radiation from the sensor itself.

FIG. 1A illustrates a device for determining temperature and or emissivity including two radiation sensors 101a and 101b. The radiation sensors 101a-b are configured to view the target 103, which is at an unknown target temperature $T_T$ or $T_{target}$. In turn, the target 103 is configured to view the two radiation sensors 101a-b, which are held at different respective viewed temperatures $T_A$ and $T_B$, respectively. The radiation sensor 101a has a field of view 111a, and the radiation sensor 101b has a field of view 111b. In FIG. 1A, the radiation sensors are thermopile sensors. However, in other embodiments, the radiation sensors can be other types of sensors such as bolometers.

A thermistor 105a monitors the temperature of radiation sensor 101a and outputs a signal 107a indicating the viewed temperature $T_A$. Similarly, a thermistor 105b monitors the temperature of the radiation sensor 101b and outputs a signal 107b indicating the viewed temperature $T_B$. The radiation sensors 101a and 101b output signals 109a and 109b indicating net heat fluxes $Q_{Anet}$ and $Q_{Bnet}$ detected at the radiation sensors, respectively. While the thermistor 105a is used to monitor temperature in the device of FIG. 1A, resistance temperature detectors (RTDs) or other types of temperature probes can be used to monitor temperature in other embodiments.

A temperature/emissivity analyzer 121 receives the signals indicating radiation sensor temperatures $T_A$ and $T_B$ and, since the sensors are thermopile sensors, the plural net heat fluxes $Q_{Anet}$ and $Q_{Bnet}$. Based on the measured sensor temperatures $T_A$ and $T_B$ and the plural net heat fluxes $Q_{Anet}$ and $Q_{Bnet}$ the analyzer 121 can determine the temperature $T_T$ of the target 103 using principles that are described hereinafter in conjunction with FIGS. 1B and 2.

The temperature $T_T$ can be reported via an output signal 125, and the temperature is determined independent of emissivity of the target. Namely, the emissivity of the target 103 need not be known in order to determine the temperature $T_T$. Furthermore, using the same measured sensor temperatures $T_A$ and $T_B$ and the net heat fluxes $Q_{Anet}$ and $Q_{Bnet}$, the analyzer 121 can determine the emissivity of the target 103, and the emissivity can be reported by the analyzer 121 as an output signal 123. Alternatively, the emissivity can be determined by the analyzer 121 and output without determining the temperature $T_T$. The determination of temperature performed by the analyzer 121 is independent of an emissivity of the target because the emissivity of the target can be an arbitrary and unknown value.

Figure 1B:
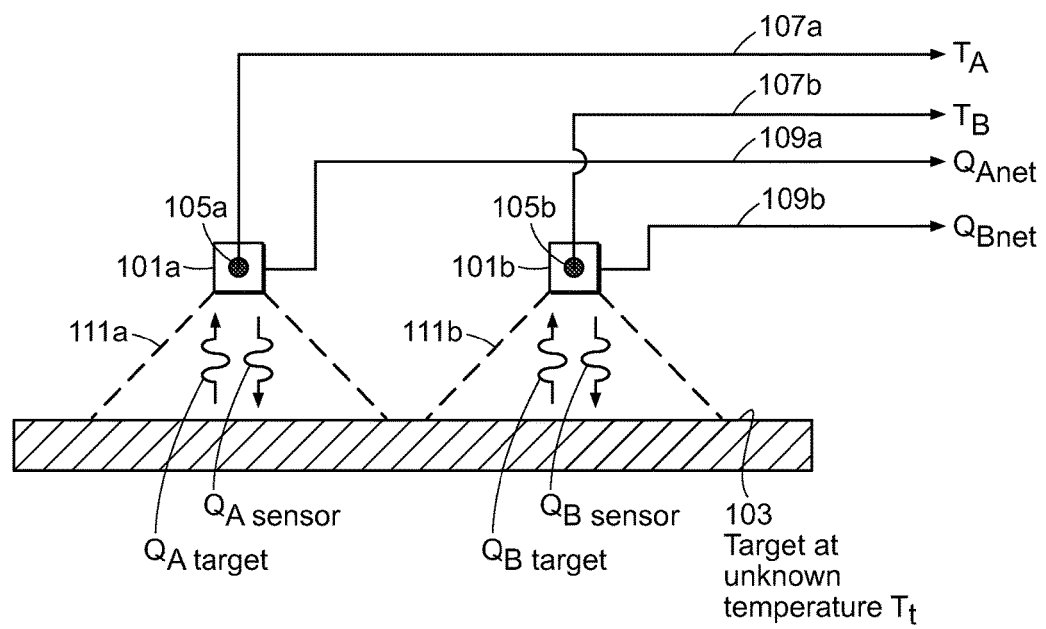
FIG. 1B illustrates radiation emitted from and received by the two radiation sensors in FIG. 1A.

FIG. 1B schematically illustrates the radiation emitted from and received at the thermopile radiation sensors 101a and 101b. The sensors 101a and 101b receive radiation $Q_{Atarget}$ and $Q_{Btarget}$, respectively. In turn, sensors 101a and 101b emit radiation $Q_{Asensor}$ and $Q_{Bsensor}$, respectively. The thermopile sensors 101a and 101b output signals 109a and 109b, which are proportional to $Q_{Anet}$ and $Q_{Bnet}$, respectively. Thus, the net radiation detected by radiation sensor 101a is $$Q_{Anet} = Q_{Atarget} - Q_{Asensor}.$$

Likewise, the net radiation detected at the radiation sensor 101b is $$Q_{Bnet} = Q_{Btarget} - Q_{Bsensor}.$$

The signals 109a and 109b, which indicate the $Q_{Anet}$ and $Q_{Bnet}$, respectively, are introduced to the analyzer 121 shown in FIG. 1A for determination of temperature and/or emissivity.

Theoretical considerations useful to determine temperature and emissivity will now be described. For simplicity, the present disclosure assumes that all objects are diffuse emitters. A diffuse emitter is a surface that emits and absorbs radiation from all directions equally well. Diffuse emitters are sometimes termed hemispherical emitters. The results presented herein do not depend on the diffuse emitter assumption, but directionality is nevertheless ignored as a matter of convenience. Note that geometrical view factors are also ignored as a matter of convenience, since the sensor's field of view is typically fixed for this application and the sensor's output signal is a product of the geometrical view factor and the sensitivity of the sensor. Since the output sensitivity of a thermopile is usually individually calibrated for each device as a practical matter, the gain adjustment can be made to account for both the sensitivity of the thermopile and the geometry of the sensor.

A blackbody is a theoretical object that emits thermal radiation at the maximum possible rate at all wavelengths and absorbs all radiation falling upon it. A blackbody functions as the standard to which the emission and absorption of real surfaces are referenced. The energy radiated per unit area by a blackbody at a given temperature and wavelength is given by the Planck Distribution:

$$E(\lambda, T) = \frac{2\pi hc^2 \lambda^{-5}}{e^{\frac{hc}{(k\lambda T)}} - 1} \quad (1.1)$$

where h is Planck's constant (6.6262×10⁻³⁴ J s), c is the speed of light (2.9979246×10⁸ m/s), λ is the wavelength of the radiation, k is the Boltzmann constant (1.380662×10²³ J/K), and T is the temperature of the surface in Kelvin.

Emissivity, ε, is a property of a physical surface, and it refers to the efficiency of emitting and absorbing infrared radiation, as a fraction of the radiation that would be emitted or absorbed by an equivalent blackbody. Therefore, the values of emissivity for real surfaces vary between 0 and 1. Emissivity can vary as a function of wavelength, temperature, and even with time as the condition of a surface changes.

The total amount of energy emitted by a real object (non-blackbody) can be found by integrating the product of the emissivity of the object and the energy emitted by a blackbody, Equation 1.1 over all wavelengths:

$$Q = \int_0^\infty \varepsilon(\lambda, T) E(\lambda, T) d\lambda \quad (1.2)$$

An assumption often made is that emissivity is independent of wavelength (and everything else); the surface is then referred to as being a "greybody." In the case of a greybody, the emissivity is a constant between zero and one, and evaluating the above integral gives:

$$Q = \varepsilon \sigma T^4 \quad (1.3)$$

where σ is the Stefan-Boltzmann constant.

Figure 2:
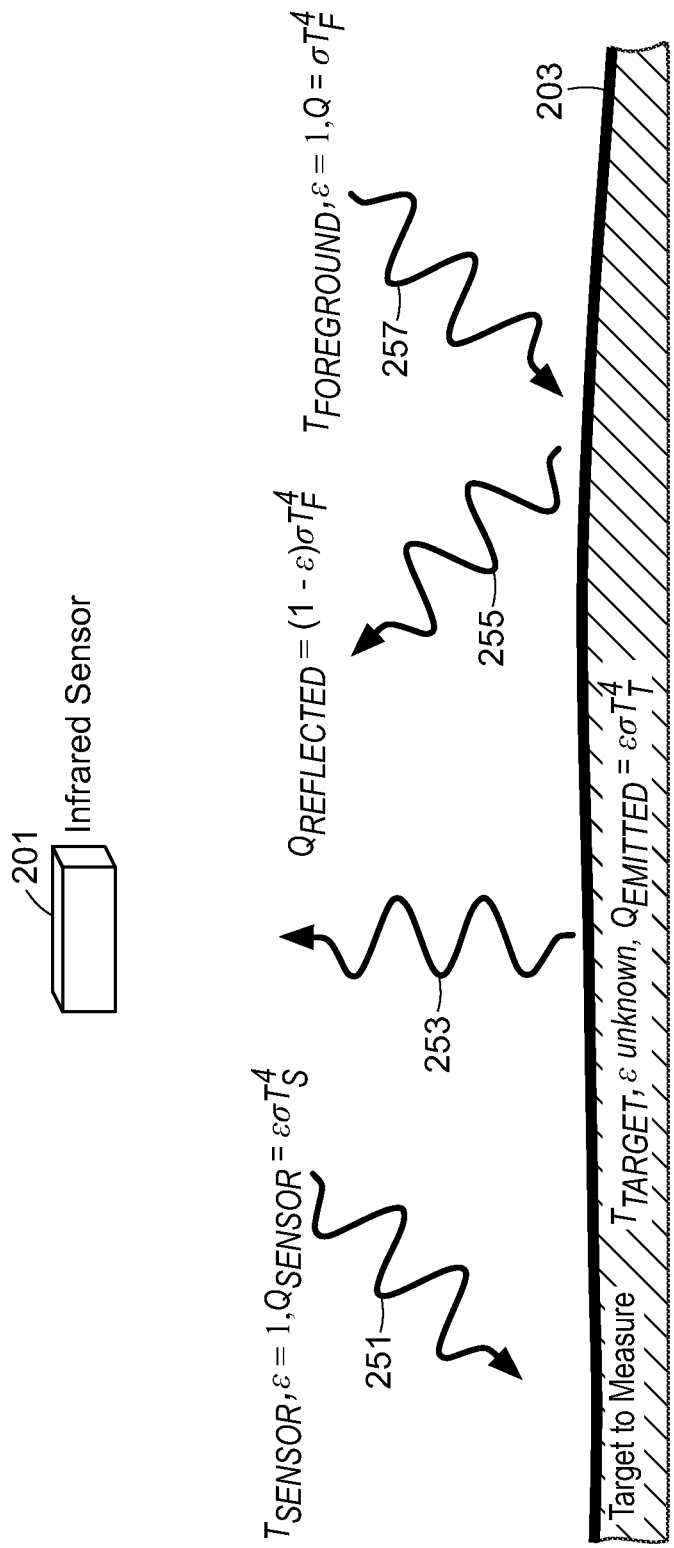
FIG. 2 is a schematic diagram illustrating sources of thermal radiation absorbed and emitted by an infrared sensor viewing an opaque target, using gray body assumptions.

FIG. 2 is a schematic diagram illustrating sources of thermal radiation absorbed and emitted by an infrared sensor 201 using greybody assumptions. The IR sensor 201 emits energy 251. An opaque target 203 emits energy 253. When infrared energy 257 from a foreground is incident on the surface of the target 203, a portion 255 of the foreground energy is reflected.

As illustrated in FIG. 2, the net heat flow at the sensor is a combination of energy that is reflected and emitted by the target surface, minus the energy that is emitted by the sensor itself. This net heat flow actually measured by the thermopile is termed $Q_{net}$ in Equation 1.4:

$$Q_{net} = -Q_{sensor} + Q_{emitted} + Q_{reflected} \quad (1.4)$$

Any given radiation that falls on a surface is either absorbed, reflected, or transmitted through the object. Under steady state conditions, absorption is equal to emissivity, and:

$$\varepsilon + \tau + r = 1$$

where τ is the transmissivity, and r is the reflectivity of the target. Further, where the target is opaque, τ=0, and the relationship becomes simply:

$$\varepsilon + r = 1 \quad (1.5)$$

In order to use the output signal of a thermopile to compute the temperature of the target object being measured, an independent reference measurement of the temperature of the thermopile is needed. This reference temperature is required to compute the value of the heat flux emitted by the absorber area of the thermopile, $Q_{sensor}$ in Equation 1.4.

Radiation reflected from the target and received by the sensor can include background and foreground sources, in addition to radiation emitted by the sensor. Background sources include sources in the vicinity of the sensor, such as a sensor housing or sensor background surface, which can be viewed by the target surface. Foreground sources include sources other than the target surface that can be viewed by the sensor or otherwise detected by the sensor after reflection from the target surface. These sources can include ambient air and objects other than the sensor and target that emit radiation that can leak into a space between the sensor and target, for example.

In the case where the target is a greybody, and where all sources of reflections from the target are at the same temperature as the sensor, the background, foreground, and sensor behave as blackbodies; and the sensitivity of the thermopile is invariant with respect to wavelength. Under this greybody condition, and starting from Equations 1.3 and 1.4, the temperature of the target can be computed as:

$$Q_{net} = -\sigma T^4_{sensor} + \varepsilon \sigma T^4_{target} + r\sigma T^4_{sensor}$$

$$Q_{net} = -(1-r)\sigma T^4_{sensor} + \varepsilon \sigma T^4_{target}$$

Taking note of Equation 1.5, this can be simplified to:

$$Q_{net} = \varepsilon \sigma T^4_{target} - \varepsilon \sigma T^4_{sensor} \quad (1.6)$$

Equation 1.6 can also be written as $$Q_{net} = \varepsilon \sigma (T_T^4 - T_S^4),$$

where $T_T$ is $T_{target}$ and $T_S$ is $T_{sensor}$.
Rearranging Equation 1.6 to solve for the temperature of the target gives:

$$T_{target} = \sqrt[4]{\frac{Q_{net}}{\varepsilon \sigma} + T^4_{sensor}} \quad (1.7)$$

In the real world, it is rare for all of those assumptions to be true. For example, since sensors built for measuring the IR radiation from cool targets normally have a filter window installed whose transmission of IR varies with wavelength, the integration of Equation 1.2 requires an additional term in the integrand for the variable transmission with wavelength, and becomes:

$$Q = \int_0^\infty \tau_{filter}(\lambda)\varepsilon(\lambda,T)E(\lambda,T)d\lambda \quad (1.8)$$

If the target to be measured is assumed to be a greybody, then the emissivity in Equation 1.8 is constant and can be pulled out of the integrand, and the equation simplifies to:

$$Q = \varepsilon \int_0^\infty \tau_{filter}(\lambda)E(\lambda,T)d\lambda \quad (1.9)$$

Two assumptions can then be made with appropriate construction of the system, namely that the emissivity of the sensor's active area is 1, and the ambient background temperature surrounding the sensor is uniform and identical to the temperature of the sensor. With these assumptions, Equation 1.4, Equation 1.5, and Equation 1.9 can be combined and give:

$$\int_0^\infty \tau_{filter}(\lambda)E(\lambda, T_{target})d\lambda = \frac{Q_{net}}{\varepsilon} + \int_0^\infty \tau_{Filter}(\lambda)E(\lambda, T_{sensor})d\lambda, \quad (1.10)$$

where $T_{sensor}$ is the viewed temperature of the sensor viewed by the target.

The integrations of Equation 1.10 can be carried out numerically, and the results can be used to generate a function f, wherein the target temperature is given as a function of the other variables involved:

$$T_{target} = f\left(\frac{Q_{net}}{\varepsilon} + \int_0^\infty \tau_{filter}(\lambda)E(\lambda, T_{sensor})d\lambda\right) \quad (1.11)$$

If $\varepsilon$ is known, Equation 1.11 can be used to calculate the target temperature. Moreover, where $\varepsilon$ is not known or changes over time, $\varepsilon$ can be determined using two identical sensors such as 101a-b viewing the same target, but held at different sensor temperatures. Using two sensors at different respective viewed sensor temperatures, it is possible to solve for both target temperature and the emissivity of the surface being measured.

Each sensor 101a-b in the pair is governed by Equation 1.10. If the sensors are identical in construction and are looking at the same target surface at the same time, all of the terms in the integral on the left side of Equation 1.10, ($\tau_{filter}$ and $E(\lambda, T_{target})$), are identical, therefore the entire integral is identical in the equation for each sensor. The equality for the right hand side of the two versions of Equation 1.10 for the pair of sensors 101a-b can be written as:

$$\frac{Q_{Anet}}{\varepsilon} + \int_0^\infty \tau_{filter}(\lambda)E(\lambda, T_{Asensor})d\lambda = \frac{Q_{Bnet}}{\varepsilon} + \int_0^\infty \tau_{filter}(\lambda)E(\lambda, T_{Bsensor})d\lambda, \quad (1.15)$$

where $T_{Asensor}$ and $T_{Bsensor}$ are different respective viewed temperatures viewed by the target surface.

Using the term $Q_{sensor}$ for the heat flux emitted by the sensor (the physical meaning of the remaining integrals), solving Equation 1.15 for emissivity, gives:

$$\varepsilon = \frac{(Q_{Anet} - Q_{Bnet})}{(Q_{Asensor} - Q_{Bsensor})} \quad (1.16)$$

It can be seen from Equation 1.16 that for a meaningful calculation of emissivity, the sensors must be at different temperatures. The value of E calculated from Equation 1.16 can be used in Equation 1.11 to calculate a temperature that is independent of emissivity of the target, i.e., can be calculated regardless of the target emissivity and without prior knowledge of the value of the target emissivity. Further, the temperature may be determined directly if desired, without a separate step of determining emissivity. Specifically, using two versions of Equation 1.10, one for each sensor, $\varepsilon$ falls out, and the equations can be solved for target temperature as follows:

$$T_{target} = f\left(\frac{Q_{Anet}\int_0^\infty \tau_{filter}(\lambda)E(\lambda, T_{Bsensor})d\lambda - Q_{Bnet}\int_0^\infty \tau_{filter}(\lambda)E(\lambda, T_{Asensor})d\lambda}{(Q_{Anet} - Q_{Bnet})}\right), \quad (1.17)$$

where the left and right integrals can be termed $Q_{Bsensor}$ and $Q_{Asensor}$, respectively, as done in Equation 1.16.

For most applications, the emissivity can be expected to vary far more slowly than the target temperature. In those applications, a low pass filter with a fairly low frequency cut-off (on the order of seconds, and perhaps even on the order of minutes) can be applied to the determined emissivity. If such a filter is used, any errors arising from the determined 8 can be further reduced by determining the target temperature using the data from the sensor of the pair that minimizes the quantity $|T_{target} - T_{sensor}|$.

Moreover, the above-described method for determining emissivity and/or temperature can also be performed using a device with only one radiation sensor. In most applications requiring the measurement of the temperature of an object with unknown and/or variable emissivity, emissivity is a constant, or emissivity slowly varies due to changes to the surface of the target. In applications where emissivity can be treated as constant over moderate periods of time, the advantages of viewing a target with two sensors held at different temperatures can be achieved using a single sensor by changing a temperature of the sensor with time. Sensor readings separated in time can then be used in the same way, as described above for separate sensors, to determine emissivity of the target surface. Moreover, multiple sensor measurements of heat flux can be obtained at each temperature by causing the temperature of the sensor to oscillate in time. Using a single sensor design can have additional advantages compared with a two-sensor design, such as decreased power draw, decreased need for large and uniform target surfaces, decreased cost, and decreased sensitivity to calibration precision of sensors.

Figure 3A:
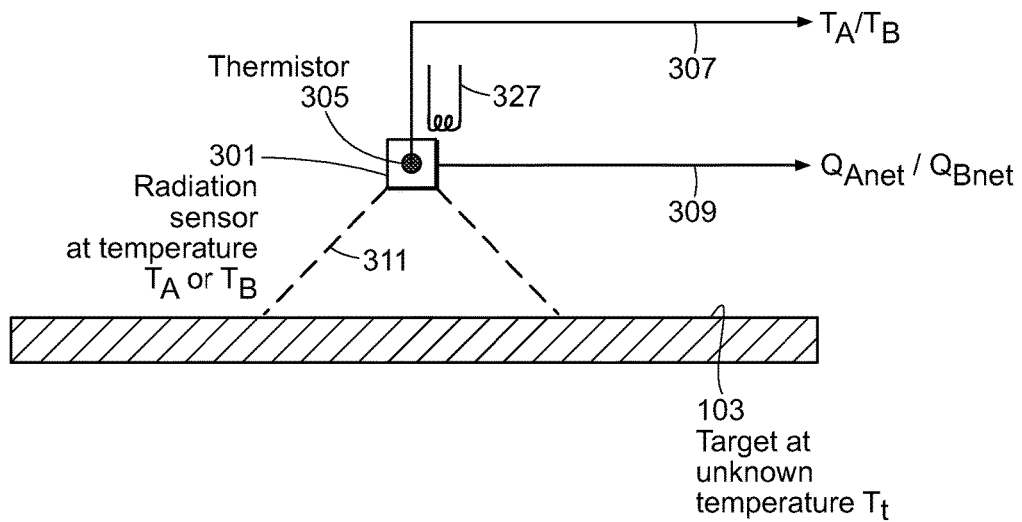
FIG. 3A illustrates a one-radiation-sensor device for determining temperature and/or emissivity of a target.

FIG. 3A shows a single-sensor device for determining temperature and/or emissivity of the target surface 103. A particular advantage of the single-sensor device of FIG. 3A is insensitivity to greybody contamination of the sensor window (not shown), without regard to any degree of contamination of any second sensor window. In FIG. 3A, a single radiation sensor 301 is configured to view the target surface 103 with a field of view 311. A thermistor 305 monitors a temperature of the sensor 301, and a heater 327 controls the temperature of the radiation sensor 301. The heater 327 is controlled by a thermal controller, which is not shown. In other devices, both heating and cooling can be required for thermal control of the sensor, and thermoelectric coolers, for example, can be used.

The heater 327 causes the radiation sensor 301 to oscillate in temperature between two different respective viewed temperatures $T_A$ and $T_B$. The temperatures $T_A$ and $T_B$ are monitored by the thermistor 305 and reported in the form of an output signal 307. The radiation sensor 301 measures the plural net heat fluxes $Q_{Anet}$ and $Q_{Bnet}$, which are reported in the form of an output signal 309. With the two temperatures $T_A$ and $T_B$ and the two net heat fluxes $Q_{Anet}$ and $Q_{Bnet}$ measured, the emissivity and or temperature of the target 103 can be determined using the same equations as described above in conjunction with FIGS. 1A-1B and 2. Specifically, $$\varepsilon = \frac{(Q_{Anet} - Q_{Bnet})}{(Q_{Asensor} - Q_{Bsensor})} \quad (1.16)$$

and $$T_{target} = f\left(\frac{Q_{Anet}\int_0^\infty \tau_{filter}(\lambda)E(\lambda, T_{Bsensor})d\lambda - Q_{Bnet}\int_0^\infty \tau_{filter}(\lambda)E(\lambda, T_{Asensor})d\lambda}{(Q_{Anet} - Q_{Bnet})}\right). \quad (1.17)$$

Figure 3B:
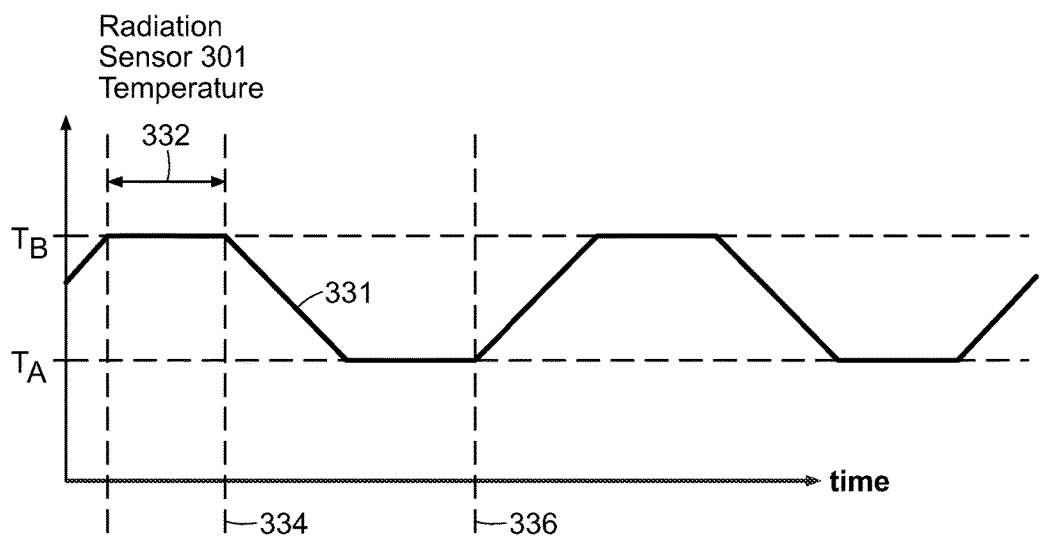
FIG. 3B illustrates example temperature changes that can be applied to the sensor in FIG. 3A.

FIG. 3B shows the temperature of the radiation sensor 301 as a function of time. The temperature is initially ramped up to the higher temperature $T_B$, and the temperature is allowed to stabilize over a time period 332. At the end of the time period 332, $Q_{Bnet}$ is measured by the radiation sensor 301 at time 334. Following the measurement of $Q_{Bnet}$, at 331 the temperature is ramped down to the lower temperature $T_A$. Similarly, the temperature $T_A$ is allowed to stabilize over a period of time, and following the stabilization period, $Q_{Anet}$ is measured at time 336. The emissivity and temperature of the target 103 are then determined based on the measurements, and the process is repeated as the temperature of the radiation sensor 301 continues to oscillate. For some applications, instead of determining a target temperature each time $Q_{Anet}$ and $Q_{Bnet}$ are measured, the target temperature is determined only after measuring $Q_{Anet}$ and $Q_{Bnet}$ multiple times over several temperature cycles and averaging. Moreover, in some applications, the temperature profile can be different from that shown in FIG. 3B.

The temperature output of the device in FIG. 3A can output temperatures at the fastest sampling rate possible, and a digital filter can be applied to the inputs for the emissivity and temperature calculations. The device can then be enabled to accurately track fast transients in temperature, and reporting of changes in emissivity can be limited to those that occur at frequencies lower than twice the rate at which the sensors temperature is oscillated, for example. Furthermore, any errors due to aliasing of changes in the target temperature to the device temperature can be minimized by oscillating the temperature of the sensor 301 in a stochastic manner. Namely, instead of oscillating the sensor's temperature at a fixed frequency, the frequency and magnitude of the temperature variation can be varied randomly or pseudorandomly. The stochastic approach can limit the maximum possible errors generated by coincident oscillation in the target temperature. Limiting these errors can be important because many temperature control systems use an output with a regular frequency, and control loops often have a small oscillation about the setpoint, termed "hunting" when they are in operation.

Figure 4A:
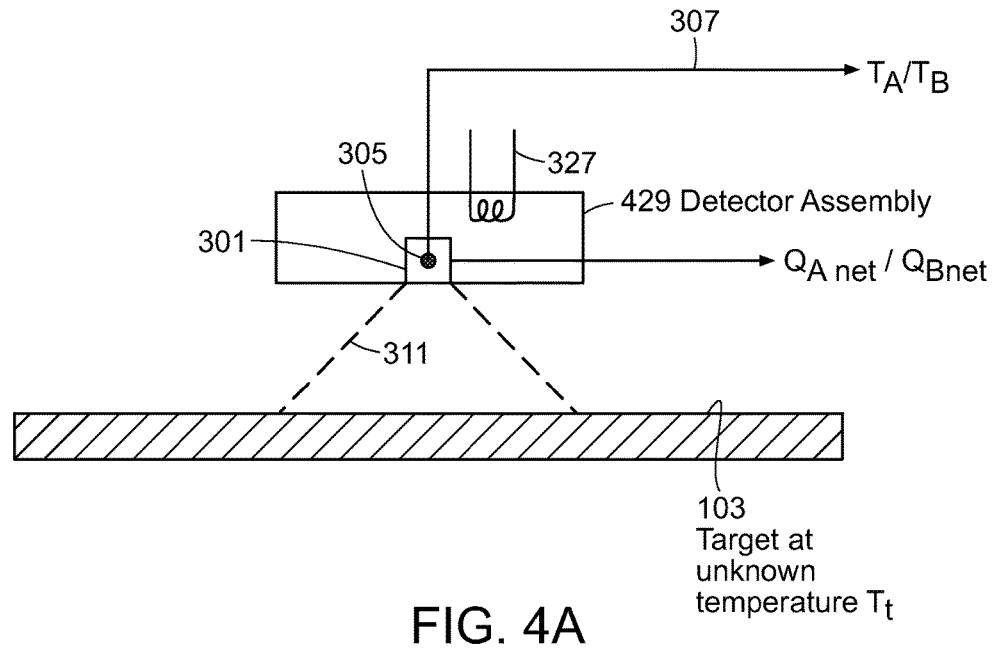
FIG. 4A illustrates a radiation sensor as part of a detector assembly.
Figure 4B:
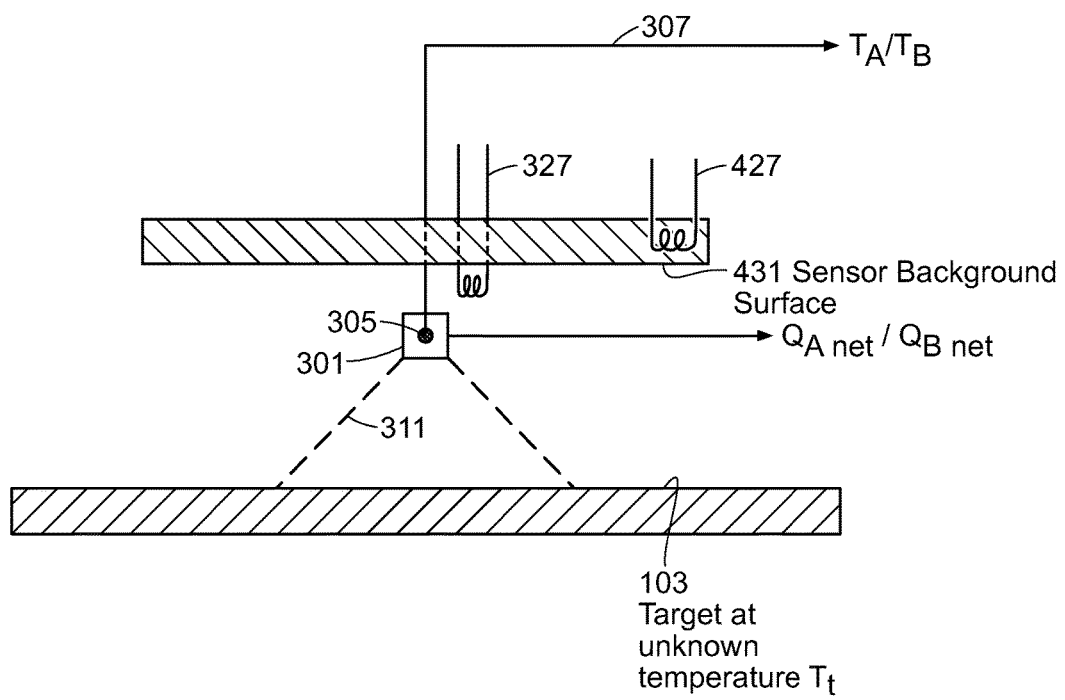
FIG. 4B illustrates the single-radiation-sensor device of FIG. 3A, further including an opaque sensor background surface temperature controlled to match a temperature of the radiation sensor.

FIGS. 4A and 4B illustrate that radiation reflected from a target surface can include radiation emitted from sources other than a sensor. FIG. 4A illustrates how the sensor 301 can be part of a detector assembly 429. The detector assembly 429 is maintained at the same temperature as the sensor 301 by the heater 327. Thermal radiation detected at the sensor 301 includes radiation emitted from the detector assembly 429 and reflected from the target 103. Because the detector assembly 429 is maintained at the same temperature as the sensor 301, any contribution of radiation from the detector assembly 429 to the net heat flux measured by the radiation sensor 301 does not affect the equations previously described that allow temperature and emissivity to be determined.

FIG. 4B illustrates that the device of FIG. 3A can also be used where the sensor 301 detects net heat fluxes that include radiation emitted from other surfaces. In FIG. 4B, a heater 427 controls the temperature of a sensor background surface 431. Provided the temperature of the sensor background surface 431 is maintained at the same temperature as the radiation sensor 301, radiation emitted from the sensor background surface 431 and reflected from the target surface 103 to contribute to the net heat fluxes $Q_{Anet}$ and $Q_{Bnet}$ does not impact the device's ability to determine temperature and emissivity of the target surface 103 as previously described.

The temperature-controlled detector assembly 429 (in FIG. 4A) and the sensor background surface 431 (in FIG. 4B) can be used to exclude or limit any radiation from sources that are not at the same temperature as the sensor from being detected by the sensor. Thus, for example, even if the temperature of the ambient area around the sensor is not at the sensor temperature, sensor temperature and emissivity can still be measured accurately provided that the detector assembly 429 or background surface 431 is sufficiently large or sufficiently close to the target surface 103 to effectively block radiation originating from sources external to the device.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of determining temperature, the method comprising:
   providing one or more radiation sensors configured to measure net heat flux;
   detecting, with the one or more radiation sensors viewing a target, plural net heat fluxes as the target views different respective radiation sensor temperatures;
   effectively excluding, from the plural net heat fluxes, using a blocking structure, any heat flux from non-target sources at temperatures other than the respective radiation sensor temperatures;
   determining, independent of an emissivity of the target, a temperature of the target based on the plural net heat fluxes and on the different respective radiation sensor temperatures; and
   outputting the temperature of the target.

2. The method of claim 1, further comprising changing a temperature of one of the one or more radiation sensors to achieve the respective radiation sensor temperatures, the detecting the plural net heat fluxes performed by the one radiation sensor with the one radiation sensor at the respective radiation sensor temperatures.

3. The method of claim 2, wherein changing the temperature of the one of the one or more radiation sensors comprises oscillating the temperature of the one of the one or more radiation sensors.

4. The method of claim 1, wherein detecting the plural net heat fluxes is with respective ones of the radiation sensors as the target views the respective ones of the radiation sensors held at the different respective radiation sensor temperatures.

5. The method of claim 1, wherein determining the target temperature is based further on a transmission factor of a window between the radiation sensor and the target.

6. The method of claim 1, wherein at least one of the net heat fluxes includes heat flux emitted from both a radiation sensor of the one or more radiation sensors and from the blocking structure, the blocking structure being an opaque sensor background surface that is temperature controlled to match a temperature of the radiation sensor.

7. The method of claim 1, wherein the one or more radiation sensors are thermopile or bolometer sensors.

8. The method of claim 1, wherein at least one of the plural net heat fluxes includes heat flux emitted from both a radiation sensor of the one or more radiation sensors and from the blocking structure, the blocking structure being a detector assembly that is temperature controlled to match a temperature of the radiation sensor.

9. A temperature measurement device comprising:
   one or more radiation sensors configured to view a target and to detect plural net heat fluxes as the target views respective radiation sensor temperatures;
   blocking structure associated with the one or more radiation sensors and configured to effectively exclude, from the plural net heat fluxes, any heat flux from non-target sources at temperatures other than the respective radiation sensor temperatures; and
   an analyzer configured to determine, independent of an emissivity of the target, and without the emissivity of the target being known or assumed, a temperature of the target based on the plural net heat fluxes and on the respective radiation sensor temperatures, the analyzer having an output for outputting the temperature of the target.

10. The device of claim 9, further comprising a thermal controller operationally connected to a heater or cooler in thermal communication with one of the one or more radiation sensors, the thermal controller configured to change a temperature of the one of the one or more radiation sensors to achieve the respective radiation sensor temperatures, and the one of the one or more radiation sensors being configured to detect the plural net heat fluxes with the one radiation sensor temperature at the respective radiation sensor temperatures.

11. The device of claim 10, wherein the thermal controller is further configured to cause the temperature of the one of the one or more radiation sensors to oscillate.

12. The device of claim 9, comprising two or more radiation sensors configured to detect respective ones of the plural net heat fluxes as the target views the respective ones of the radiation sensors held at the different respective radiation sensor temperatures.

13. The device of claim 9, wherein the analyzer is configured to determine the temperature of the target based further on a transmission factor of a window between the radiation sensor and the target.

14. The device of claim 9, wherein the blocking structure associated with the one or more radiation sensors is a detector assembly that is temperature controlled to match a temperature of one of the one or more radiation sensors, and wherein at least one of the plural net heat fluxes includes heat flux emitted from both the one radiation sensor and from the detector assembly.

15. The device of claim 9, wherein the blocking structure associated with the one or more radiation sensors is an opaque sensor background surface that is temperature controlled to match a temperature of a radiation sensor of the one or more radiation sensors, and wherein at least one of the plural net heat fluxes includes heat flux emitted from both the radiation sensor of the one or more radiation sensors and from the opaque sensor background.

16. The device of claim 9, wherein the radiation sensors are thermopile or bolometer sensors.

17. A method of determining temperature, the method comprising: providing a radiation sensor configured to measure net heat flux;
   detecting plural net heat fluxes with the radiation sensor viewing a target, as the target views different respective radiation sensor temperatures;
   effectively excluding, from the plural net heat fluxes, using a blocking structure, any heat flux from non-target sources at temperatures other than the respective radiation sensor temperatures; and determining a temperature of the target, independent of an emissivity of the target, based on the plural net heat fluxes and the respective radiation sensor temperatures; and
   outputting the temperature of the target.

* * * * *